April 10, 1956 T. E. BRYAN 2,741,189
REMOVABLE GAS CONTROL VALVE FOR OIL WELLS
Filed Aug. 7, 1951 2 Sheets-Sheet 1
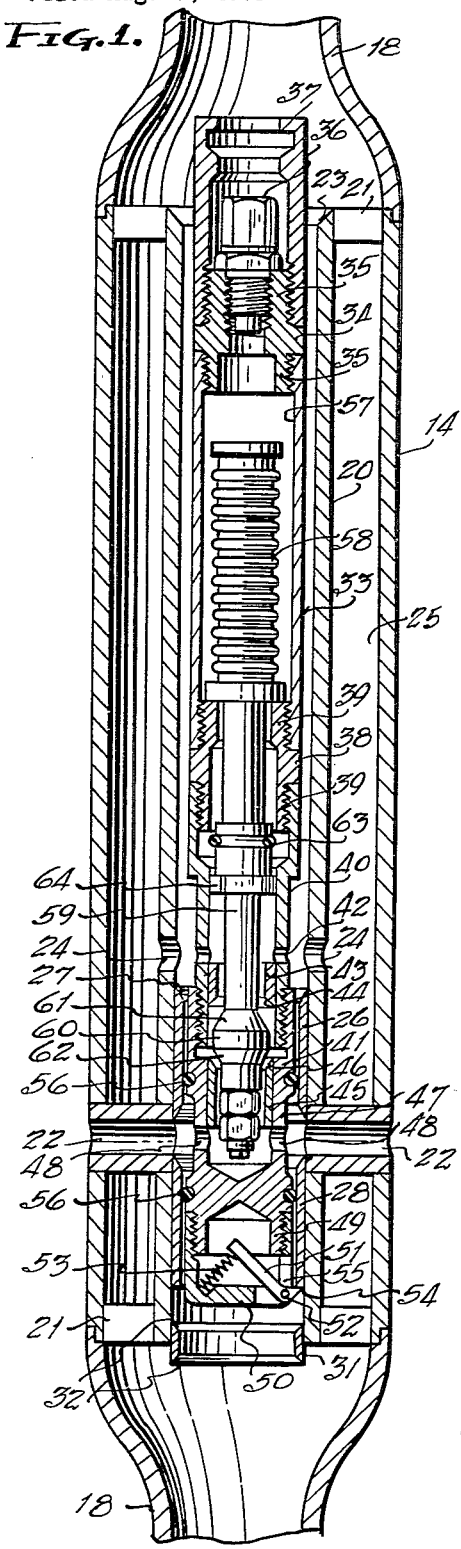
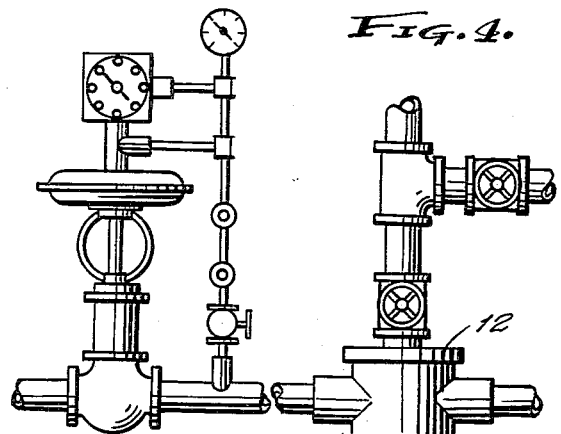
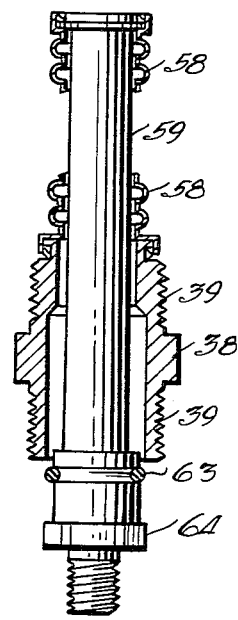
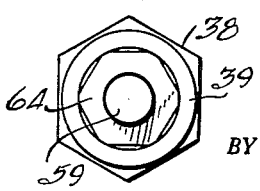
THOMAS E. BRYAN
INVENTOR.
BY
ATTORNEY April 10, 1956 T. E. BRYAN 2,741,189
REMOVABLE GAS CONTROL VALVE FOR OIL WELLS
Filed Aug. 7, 1951 2 Sheets-Sheet 2
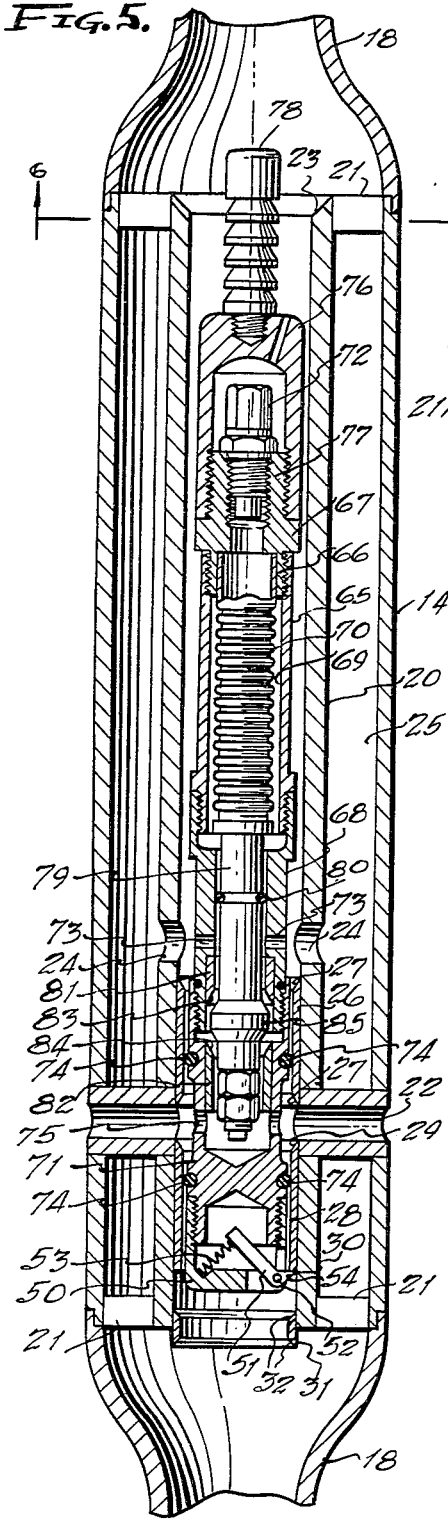
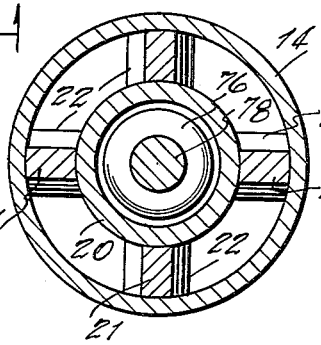
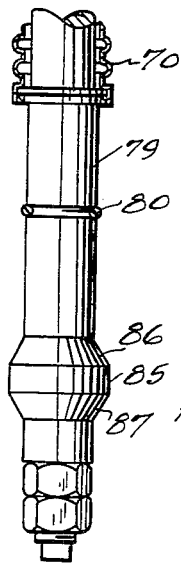
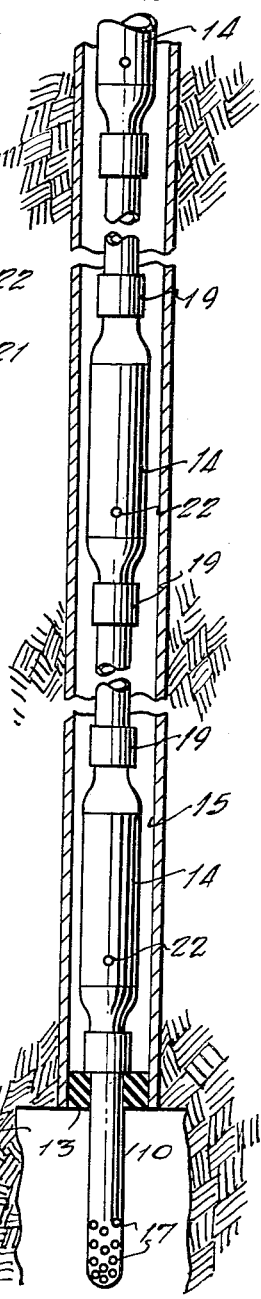
THOMAS E. BRYAN
INVENTOR.
BY
ATTORNEY

United States Patent Office 2,741,189
Patented Apr. 10, 1956

2,741,189

REMOVABLE GAS CONTROL VALVE FOR OIL WELLS

Thomas E. Bryan, Fort Worth, Tex.

Application August 7, 1951, Serial No. 240,658

4 Claims. (Cl. 103—233)

This invention relates to equipment for producing oil from oil wells by artificial gas pressures, and more particularly to gas lift valves for controlling such pressures to effect the movement of the oil to the surface as the same enters the well conduit from the producing formations and forms a suitable fluid column, and the improvements herein described are related in part to devices described in applicant's co-pending applications bearing Serial No. 124,697, now abandoned, and No. 66,605, now Patent No. 2,681,014.

The principal object of the invention resides in the provision of improvements in gas lift valves of the type which intermittently functions to admit gas pressures from the well casing, which have been introduced thereinto at the earth's surface, to the flow tube of the well as the liquid column therein assumes a level usually determined by cycles of measured time intervals, although it is desirable, in some installations, to construct the valve and its supporting element so that it will be amenable to tubing pressures for operation as well as gas pressures in the casing.

An object of the invention is that of providing a system for producing oil automatically by injected pressures and employing such pressures, or the weight of the fluid column itself, to actuate the valve mechanism to admit a sufficient quantity of the injected pressures to the fluid column to eject the latter and then close the valve by reducing the flow conduit pressures to a predetermined value.

Another object of the invention resides in the provision of a fitting of unique design, which is installed at spaced elevations along the flow conduit, and formed with an internal receptacle for the valve mechanism which can be removably installed therein from the earth's surface by suitable means, as by a cable, or by simply dropping the valve assembly through the tubing to be seated in its special receptacle and at the proper level, according to its diametrical measurements and peculiar adjustments.

A prime object of the invention manifests itself in the provision of a valve mechanism which is compactly embraced within a housing whose circumferential dimensions will vary according to its location in the well, its receptacle or seat being capable of operatively supporting the valve concentrically of the fitting in which it is installed without interrupting the flow of well fluids into the tubing but communicating with the casing externally of the well tubing to admit gas pressures therefrom, at proper intervals, to the tubing to raise the oil therein.

It is also an object of the invention to provide a valve mechanism whose closure is normally retained on its seat by a bellows element which is loaded by injected pressure to a predetermined value so that the valve can be opened only by casing or tubing pressures which exceed that of the bellows element.

The paramount objects of the invention being thus made apparent lesser objects will become manifest as the description proceeds, taken in connection with the appended drawings wherein:

Figure 1 is a vertical sectional view of one form of the invention showing the valve mechanism removably installed in a special fitting adapted for connection in a well tubing.

Figure 2 illustrates, in longitudinal section, the type of bellows element employed in the device shown in Figure 1 and which is open to casing or tubing pressures at one end.

Figure 3 is an inverted plan view of the structure shown in Figure 2.

Figure 4 illustrates, in fragmentary partial cross-section, a typical installation of a series of spaced fittings in the tubing string, and showing a time cycle device at the top of the casing.

Figure 5 is a longitudinal cross-sectional view of the special fitting in which another form of the valve assembly is installed, the bellows element therein having means for loading the same.

Figure 6 is a transverse cross-sectional view on lines 6—6 of Figure 5 showing the concentric arrangement of the seating barrel for the valve assembly within the fitting.

Figure 7 fragmentarily illustrates, in elevation, the valve stem having the closure element thereon, and fragmentarily showing a pressure loaded bellows element attached to the upper end of the stem, and Figure 8 illustrates, in vertical section, the lower portion of a typical installation, showing a series of the special fittings, a tail pipe, and a packer by which a pressure chamber is defined in the casing.

It is to be understood that the valve mechanism herein described, while an important part of the invention, is interchangeable with the mechanisms described in the co-pending applications above referred to and that such structures can be housed in the manner of those described herein and removably installed in the fittings shown and described herein.

The invention, therefore, is designed for installation in a well tubing 10 which is concentrically arranged within a casing 11 whose upper end is closed by a head 12. A packer 13 is arranged about the lower end of the tubing 10 below the lowermost of a series of fittings 14, connected therein at spaced intervals, and an annular pressure chamber 15 is defined about the tubing 10 whose lowermost end projects downwardly into the producing area 16 and has perforations 17 therein to admit the well fluids. Connected into the casing head 12 is a conventional type of time cycle device by which pressures introduced to the casing chamber 15 are controlled and properly timed, as will become apparent by reference to Figure 4.

The fittings 14 are of greater diameter than the tubing 10 and have swaged ends 18 which are reduced to the same dimension of the tubing 10 and threaded so that the fittings 14 can be connected by collars 19 into the tubing at any desired elevation therealong, as illustrated in Figures 4 and 8. A cylindrical barrel 20 is supported concentrically of each of the fittings 14 by radial spacers 21 at each end, as shown in Figures 1, 5 and 6, and by tubular nipples 22 near the lower end of the barrel 20 which extend radially therefrom and through the walls of the fitting 14 to provide a communication between the barrel 20 and the annular chamber 15 within the casing 11, as is particularly apparent in Figures 1 and 5.

It is contemplated that the internal diameter of the barrel 20 of each fitting 14 should be reduced by approximately one-eighth of an inch, according to its position in the string of tubing 14, the smaller barrel being located at the lowest level while the larger barrel 20 is connected into the tubing 10 at the uppermost level, the internal diameters of the barrels being reduced successively downwardly. Each of the barrels 20 has its upper end internally bevelled at 23 and a plurality of ports 24 are formed in each barrel toward its lower end and spaced above the arrangement of nipples 22 providing communication between the interior of the barrel 20 and the annular flow passage 25 defined around the barrel within the fitting 14.

In the lower portion of each barrel 20 is arranged a sleeve 26 whose ends 27 are bevelled to expedite seating a valve in the barrel 20 as will be presently described. The sleeve 26 is pressed into the barrel 20 and is located between the ports 24 and the nipples 22. A similar sleeve 28 is arranged within the barrel 20 below the nipples 22 and the upper inner rim 29 of this sleeve is also bevelled. The lowermost end 30 of the sleeve 28 is flat and has a function which will become apparent as the description proceeds. A ring 31 is fitted into the lower end of the barrel 20 and both inner rims 32 are bevelled, as shown in Figures 1 and 5.

The valve mechanisms employed in the invention may be of either structure illustrated in Figures 1, 2, 5 and 7, each being capable of seating in the barrel 20. The valve shown in Figure 1 has a housing which is primarily composed of a tubular section 33 having internal threads at each end. A fitting 34, formed with externally threaded portions 35, is threaded into the upper end of the section 33 and a filler valve 36 is threaded into the upper end of the fitting 34 by which the chamber defined within the section 33 can be loaded by gas pressure. A cylindrical coupler 37 for a line (not shown) is threaded upon the upper threaded portion 35 and encloses the filler valve 36.

In the lower end of the section 33 is threaded a coupling member 38 which also has opposing externally threaded portions 39 thereon, the lowermost of which is threaded into a sleeve 40 which is reduced in diameter toward its lower end and threaded into a mandrel 41. The sleeve 40 has ports 42 therein which are opposite the ports 24 in the barrel 20 when the valve assembly is properly seated therein as shown in Figures 1 and 5. Immediately below the ports 42 in the sleeve 40 is a ferrule 43 whose lower rim 44 is bevelled to form a seat. A similar ferrule 45 is arranged in the mandrel 41 below the lower end of the sleeve 40 and has its upper rim 46 bevelled to provide another seat opposite to the seat 44 and spaced therefrom.

The mandrel 41 has an external reduced portion 47 which reposes opposite the nipples 22 and defines a circumferential channel about the member 41 in which are ports 48 providing communication with the nipples 22 and thus afford a passage for gas pressures externally of the fitting 14 into the tubing 10 through the valve mechanism. The mandrel 41 is closed below the ports 48 and has a threaded flange 49 defining a small chamber enclosed by a cap 50 threaded upon the flange 49 and having a latch member 51 pivoted at 52 therein which is tensioned by a spring 53. The latch member 51 is positioned so that its toe 54, operating through a slot 55 in the cap 50, can engage the bottom end of the sleeve 28 to prevent the valve mechanism from being removed from the barrel 20 by well pressures.

Externally of the mandrel 41, and on either side of the ports 48 therein, are sealing rings 56 which provide a seat for the mandrel 41 in the seating sleeves 26 and 28 and prevent passage of pressures from the casing chamber 15 into the tubing 10 except through the valve mechanism.

In the section 33 of the valve housing is defined a pressure chamber 57 within which is arranged an extensible bellows element 58 which is attached to a valve stem 59 operating longitudinally of the housing and having a closure element 60 thereon formed with opposing bevelled faces 61 and 62 which are alternately engageable with the seats 44 and 46 of the members 43 and 45 to close communication between the ports 48 and 42. When the element 60 is disengaged from either of the seats 44 and 46 gas pressures from the casing chamber 15 can pass around the element 60.

A sealing ring 63 is arranged on the stem 59 to afford a piston-like action in the interior of the portion 39 of the fitting 38 when the valve is fully opened to prevent rupturing the bellows element 58 which, as shown in Figure 2, is open at its lower end to the ports 42 until the stem 59 moves upwardly sufficiently to bring the sealing ring 63 into the member 38.

This type of bellows element, however, is employed only in the structure shown in Figure 1 as will become apparent. The bellows element 58 is thus only instantaneously exposed to the pressures entering the assembly from the casing chamber 15 but it is constantly influenced by pressure in the chamber 57, in which it resides, to normally urge the closure 60 to the seat 46. In this structure the upper end of the bellows element 58 is rigidly attached to the upper end of the stem 59, as shown in Figure 2, and its lower end is secured to the upper end of the portion 39 of the fitting 38. A guide 64 is arranged on the stem 59 below the ring 63 and operates in the sleeve 40.

The fittings 14, with their appurtenances, are identical in both structures illustrated in Figures 1 and 5 but the valve mechanisms, while basically similar, have different arrangements of parts. The housing of the valve mechanism shown in Figure 5 is formed with a section 65 whose upper end is threaded upon the exteriorly threaded skirt 66 of a fitting 67 and has its lowermost end threaded into the interiorly threaded upper end of a sleeve 68 and defines a chamber 69 for a bellows element 70. The sleeve 68 has its lower end threaded into a mandrel 71. The fitting 67 has a filler valve 72 therein by which the bellows element 70 can be loaded with gas pressure, its upper end being connected into the skirt portion 66 of the fitting 67 and open to the valve 72.

The sleeve 68 has ports 73 therein which register with the ports 24 of the barrel 20 and the mandrel 71, which is identical with the mandrel 41 of the structure shown in Figure 1, has seating rings 74 thereon to seal off the ports 75 from either side. The locking mechanism in the lower end of the valve housing is the same as the structure shown in Figure 1, including the cap 50 in which the latch member 51 is enclosed. The filler valve 72 is enclosed within a cap 76 which is threaded upon the upper threaded portion 77 of the fitting 67. A spear 78, for attaching a line, is attached to the cap 76.

It will be noted, by reference to Figures 5 and 7, that the bellows element 70 has its upper end secured within the skirt portion 66 of the fitting 67 while its opposite end is attached to the stem 79 whose upper end extends into the element 70, as shown in Figure 7, and has a sealing ring 80 thereon which seals the lower end of the chamber 69 and operates as a piston in the sleeve 68 above the ports 73.

The valve housing shown in Figure 5 has a pair of ferrules 81 and 82, each having a bevelled seat 83 or 84, and these seats are opposingly arranged and spaced apart and on each side of the ports 75 to be alternately engaged by a closure element 85 on the stem 79 and having bevelled opposing seating surfaces 86 and 87, the bellows element 70 normally urging the closure 85 to the lower seat 84.

Referring to the structure shown in Figure 1, bellows element 58, operating in the pressure loaded chamber 57, normally urges the closure 60 to the lower seat 46 closing communication between the ports 48 and 42 so that the injected gas pressures in the casing chamber 15 are excluded from the tubing 10 until they exceed the loaded pressure of the chamber 57 whereupon the closure 60 is moved from its seat to admit gas pressures to the tubing 10. The closure 60 will engage the upper seat 44 when the tubing pressure is sufficiently reduced, thus again closing communication between the ports 48 and 42.

The pressure of the oil column in the tubing 10 will enter the valve housing through the ports 24 and 42, and thence into the bellows element 58, to aid in opening the valve in cooperation with the casing pressures in the chamber 15 which enter the fitting 14 through the nipples 22 and the valve housing through the ports 48, such pressures being effective against the lower seating surface 62 of the closure 60. As soon as the valve is opened the casing pressures will become effective against the sealing ring 63 which closes the bellows element 58 and prevents its rupture.

The loaded pressure of the chamber 57 is predetermined according to the elevation at which the valve is stationed. It is contemplated that the valve having the highest pressure in the chamber 57 is stationed at the lowermost level and each successive valve thereabove has lesser pressure. It is desirable that the lowermost valve be charged to approximately 450 pounds while each succeeding valve contains approximately 50 pounds less. The greater pressures are applied at the bottom of the well where the greater lift is required. Either of the valve structures herein described can be automatically actuated by the time cycle device shown in Figure 4. However, it is obvious that the reverse of this loading method can be employed whereby the lowest pressure valve is installed at the bottom and the highest pressure valve is installed at the top, so that as any valve is opened, either by raising the casing pressure or, by the combination of pressures in the casing and tubing, the valve will be reclosed to its normal position when either casing or tubing pressure is reduced a predetermined amount below that required to open said valve.

The bellows element 70, in the valve structure shown in Figure 5, is sealed and itself is charged with a predetermined pressure by which suitable tension is applied to the stem 79 retaining the closure 85 to its seat 84. Tubing pressures are effective on the sealing ring 80 on the stem 79 to aid in opening the valve in cooperation with the casing pressures applied to the surface 87 of the closure 85.

The tubing pressures enter the valve housing through the ports 24 and 73 to impinge the ring 80 but unless the casing pressures are exerted against the face 87 of the closure 85 at the same time the tubing pressures are insufficient to actuate the valve. This is not necessarily true, however, of the valve illustrated in Figure 1 since the bellows element affords a greater pressure area, until the ring 63 closes the same, and when this occurs the valve closure 69 has been unseated.

In operation, the normal position of the closure 85 is against the lower seat 84, remaining in this position until the tubing pressure or casing pressure, or a combination of both, is sufficiently increased to move the closure 85 away from its lower seat 84, to admit casing pressures until the tubing pressures or casing pressures are depleted below that of the bellows element 70. It is not intended to confine the response of the valve to casing or tubing pressure only but employing a combination of both to accomplish the operation of the valve. It is obvious, however, that the valve can be made to respond to either pressure.

After the valve is opened as described and the tubing pressure is reduced due to the evacuation thereof, the valve will return to its normal closed position with the casing pressure maintained at a fixed value or, if the casing pressure is increased a predetermined amount above the opening pressure of the valve, the valve element will be forced against its upper seat and remain so until either the tubing pressure increases or the casing pressure decreases, whereby the loaded pressure of the diaphragm will cause the valve element 61 to disengage its seat whereby casing pressures will again flow through the valve, and upon further reduction of casing or tubing pressures the valve element will return to the lower seat 46.

It has been stated that the diameters of the barrels 20 are progressively smaller from the topmost to the lowermost fitting 14 so that all of the valves can be installed or removed by a wire line from the earth's surface, the lowermost valve being first installed and then each successive valve at its location. As each valve is seated in its fitting the latching device 51 will secure it in position. The lowermost valve must pass through each of the upper fittings on its course downwardly or upwardly and is guided into the barrels 20 by the bevelled upper rims 23 thereof.

It is obvious that the structure herein shown and described can be modified, and the valves inverted if desirable, without departing from the spirit and intent of the invention or the scope of the appended claims.

What is claimed is:

1. A gas lift system for raising oil in oil wells comprising a casing forming a pressure chamber, a tubing in said casing, to form a flow conduit for the raised oil, a plurality of fittings in said tubing at spaced elevations through which said raised oil flows, valve receiving and support means in each of said fittings, said receiving and support means in each of said fittings having an internal diameter, with the largest diameter in the fitting located at the highest elevation and the diameter decreasing in the fittings successively downwardly of the tubing with the smallest diameter in the fitting located at the lowest elevation whereby access may be had to the lowermost of said fittings in said tubing through said fittings thereabove in said tubing and valves adapted to be lowered into said flow conduit and seated within said receiving and support means, each of said valves having an external diameter corresponding to the internal diameter of its said receiving and support means whereby the largest diameter valve is seated within the said largest diameter receiving and support means and the said smallest diameter valve seated within said smallest diameter receiving and support means at the lowest elevation.

2. A gas lift system for raising oil in oil wells comprising a casing, a tubing in said casing, to form a flow conduit for the raised oil, a plurality of fittings in said tubing at spaced elevations through which said raised oil flows, valve receiving and support means in each of said fittings comprising an inner barrel positioned within each of said fittings, each barrel having a longitudinal bore, with the largest bore in the fitting located at the highest elevation and the bores decreasing in the fittings successively downwardly of the tubing with the smallest bore in the fitting located at the lowest elevation whereby access may be had to the lowermost of said fittings in said tubing through said fittings thereabove in said tubing, each of said fittings having lateral openings therein providing communication between the interior of the barrel to the tubing and to the interior of said casing, and a valve having an external diameter corresponding to the internal diameter of the bore of its inner barrel removably seated in each of said fittings to control communication through said lateral openings between said tubing and casing.

3. A gas lift system for raising oil in oil wells comprising a casing, a tubing in said casing, to form a flow conduit for the raised oil, a plurality of fittings in said tubing at spaced elevations through which said raised oil flows, valve receiving and support means in each of said fittings, said receiving and support means in each of said fittings having a longitudinal bore, with the largest bore in the fitting located at the highest elevation and the bores decreasing in the fittings successively downwardly of the tubing with the smallest bore in the fitting located at the lowest elevation whereby access may be had to the lowermost of said fittings in said tubing through said fittings thereabove in said tubing, each of said fittings having a lateral opening providing communication between the interior bores of the said fittings to the tubing and the interior of the casing, a valve having a diameter corresponding to the diameter of the bore of its valve receiving and support means removably seated in each of said fittings to control communication through said opening between said tubing and casing, and sleeve means mounted in the bore of each of said valve receiving and support means on opposite sides of said lateral opening forming a seat for said valves and a locking means on each of said valves engageable with said sleeve means for securing said valves in said valve receiving and support means.

4. In combination with a conduit for removing liquids from a well, a series of valve receiving fittings spaced at different elevations in said conduit, each of said fittings having lateral openings therein in communication with a source of gas under pressure, passages in said fittings for the liquids rising in said conduit, a valve receiving member in each of said fittings having a longitudinal bore therein communicating with the interior of said conduit and the inner ends of said lateral openings, a pressure controlling valve adapted to be lowered into said conduit and seated within each of said valve receiving members for controlling flow through said lateral openings, each of said valves having an external diameter corresponding to the internal diameter of its valve receiving member, means on said valves to seal off the inner end of said lateral openings when seated whereby gas under presssure entering said valve receiving members through said lateral openings is communicated into said conduit through said valves, a ported valve sleeve in each of said bored members extending below said openings and forming a seat for said valves, a locking means on each of said valves insertable through said ported sleeve for engagement with the lower end of each of said sleeves for securing said valves therein.

References Cited in the file of this patent

UNITED STATES PATENTS

| | | |
|---|---|---|
| 1,772,036 | Boynton | Aug. 5, 1930 |
| 2,145,918 | Bryan | Feb. 7, 1939 |
| 2,230,107 | Garrett | Jan. 28, 1941 |
| 2,275,346 | Bryan | Mar. 3, 1942 |
| 2,339,487 | King | Jan. 18, 1944 |
| 2,465,060 | Carlisle | Mar. 22, 1949 |